United States Patent
Kim et al.

(10) Patent No.: US 8,015,008 B2
(45) Date of Patent: Sep. 6, 2011

(54) SYSTEM AND METHOD OF USING ACOUSTIC MODELS FOR AUTOMATIC SPEECH RECOGNITION WHICH DISTINGUISH PRE- AND POST-VOCALIC CONSONANTS

(75) Inventors: Yeon-Jun Kim, Whippany, NJ (US);
Alistair Conkie, Morristown, NJ (US);
Andrej Ljolje, Morris Plains, NJ (US);
Ann K. Syrdal, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 960 days.

(21) Appl. No.: 11/930,675

(22) Filed: Oct. 31, 2007

(65) Prior Publication Data
US 2009/0112594 A1   Apr. 30, 2009

(51) Int. Cl.
*G10L 15/04* (2006.01)
(52) U.S. Cl. ........ 704/254; 704/253; 704/248; 704/249; 704/256.2

(58) Field of Classification Search ............ 704/254, 704/253, 248, 249, 256.2
See application file for complete search history.

(56) References Cited

U.S. PATENT DOCUMENTS

| | | | |
|---|---|---|---|
| 6,108,627 A * | 8/2000 | Sabourin ............ | 704/243 |
| 7,146,319 B2 * | 12/2006 | Hunt .................. | 704/254 |
| 7,181,391 B1 * | 2/2007 | Jia et al. ............ | 704/231 |
| 2002/0173966 A1 * | 11/2002 | Henton .............. | 704/277 |
| 2005/0216267 A1 * | 9/2005 | Kustner et al. ...... | 704/260 |

* cited by examiner

*Primary Examiner* — Qi Han

(57) ABSTRACT

Disclosed are systems, methods and computer readable media for training acoustic models for an automatic speech recognition systems (ASR) system. The method includes receiving a speech signal, defining at least one syllable boundary position in the received speech signal, based on the at least one syllable boundary position, generating for each consonant in a consonant phoneme inventory a pre-vocalic position label and a post-vocalic position label to expand the consonant phoneme inventory, reformulating a lexicon to reflect an expanded consonant phoneme inventory, and training a language model for an automated speech recognition (ASR) system based on the reformulated lexicon.

18 Claims, 2 Drawing Sheets

SYSTEM AND METHOD OF USING ACOUSTIC MODELS FOR AUTOMATIC SPEECH RECOGNITION WHICH DISTINGUISH PRE- AND POST-VOCALIC CONSONANTS

BACKGROUND OF THE INVENTION

1. Field of the Invention

The invention relates to acoustic models for automatic speech recognition in general and, more particularly, to provide a method, system and computer media for recognizing the explicit distinctions between pre-vocalic and post-vocalic consonants.

2. Introduction

Automatic speech recognition (ASR) with a computer presents a difficult problem because of the complexity of the human language. An ASR system attempts to map the acoustic signals to a string of words in order to gain some type of understanding of an uttered sentence or command. The ASR system faces difficulty because humans use more than their ears when listening. Humans use knowledge about the speaker and the subject, grammar and diction, and also redundancy to predict words during a conversation.

The main goal in acoustic modeling for speech recognition is to define which of the conditions modify the acoustic realization of the phonemes the same way, and defining them as phoneme classes which share the acoustic models. However, the systematic difference between pre-vocalic and post-vocalic consonant creates variability and confusability that is not accounted for with the ASR techniques. Accordingly, what is needed in the art is an improved way to process speech taking these issues into consideration.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer readable media for training acoustic models for automatic speech recognition (ASR) systems. The method embodiment includes comprising the steps of receiving a speech signal, defining at least one syllable boundary position in the received speech signal, based on the at least one syllable boundary position, generating for each consonant in a consonant phoneme inventory a pre-vocalic position label and a post-vocalic position label to expand the consonant phoneme inventory, reformulating a lexicon to reflect an expanded consonant phoneme inventory, and training a language model for an ASR system based on the reformulated lexicon.

The principle of this system is to explicitly specify the consonant position within syllables for allowing accurate acoustic modeling. The principle disclosed herein may also be used in other aspect related to spoken dialog systems.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Figure 1:
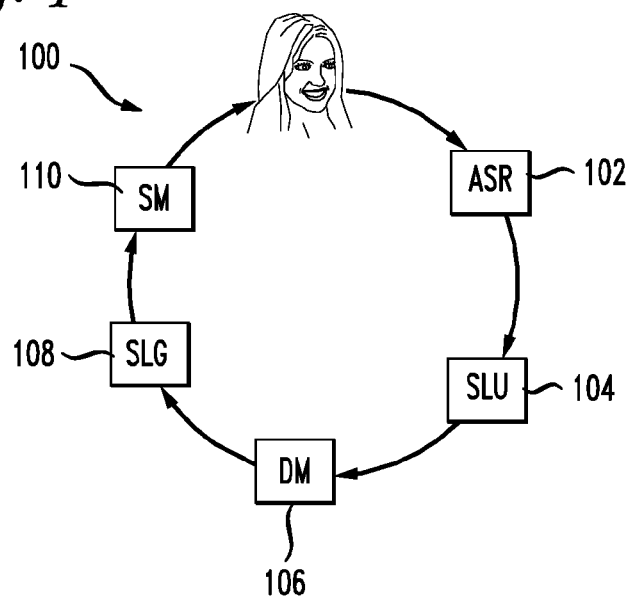
FIG. 1 illustrates the basic components of a spoken dialog system.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a synthesizing (SM) module 110. The SM module may be any type of speech output module such as a text-to-speech (TTS) module. For example, it may be a module wherein one of a plurality of prerecorded speech segments is selected and played to a user. The present invention focuses on innovations related to the ASR module 102 and may also relate to other components of the dialog system 100.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. SM module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
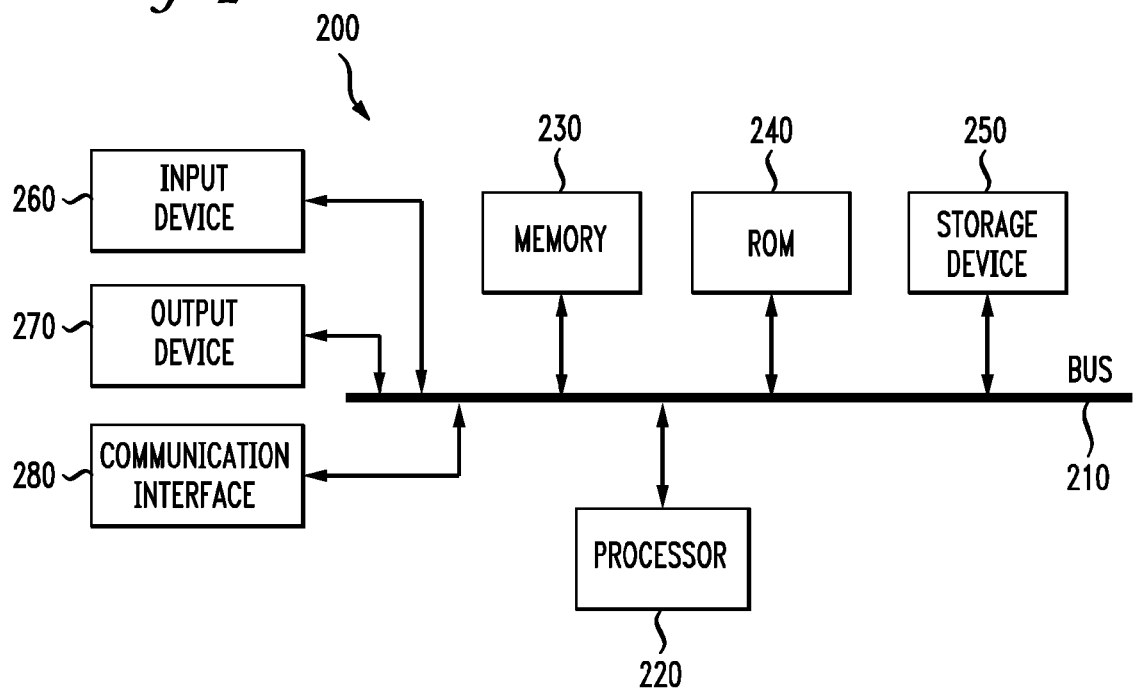
FIG. 2 illustrates an example system embodiment.

FIG. 2 illustrates an exemplar processing system 200 in which one or more of the modules of system 100 may be implemented. Thus, system 100 may include at least one processing system, such as, for example, exemplar processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the TTS voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200. System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Figure 3:
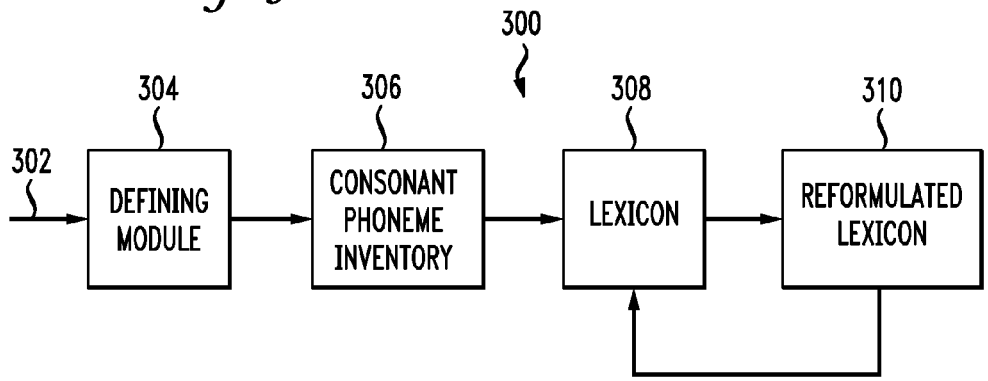
FIG. 3 illustrates a system embodiment of the invention.

Another aspect of the invention is disclosed in FIG. 3. The system 300 receives user input 302, which may include at least one signal, such as, for example, speech utterances, transcribed text, and may include the meaning of transcribed speech. The system 300 may also include a consonant phoneme inventory 306, which may include words, syllabified words, word phrases, phoneme sequences and phonetic sequences. The system 300 further comprises a lexicon 308, which may be populated with a reference index (not shown). The reference index may comprise of syllabified words, word phrases, phoneme sequences, and phonetic sequences.

The defining module 304 determines syllable boundaries by determining whether the input 302 is a pre-vocalic consonant or a post-vocalic consonant. The system determines if the input or portion of the input is a pre-vocalic consonant by indicating if the consonant is before a vowel in the word. Conversely, the system determines if the input or portion of the input is a post-vocalic consonant by indicating if the consonant is after a vowel in the word. The defining module 304 uses the pre-vocalic and post-vocalic determination to create boundary positions. The defining module 304 then communicates the boundary positions to the consonant phoneme inventory 306.

The consonant phoneme inventory 306 is comprises the smallest unit of speech that distinguishes meaning. The phoneme inventory 306 generates a pre-vocalic label or a post-vocalic label for every consonant within the inventory. Based upon the determined syllable boundary position that is assigned in the defining module 304, an expanded phoneme inventory is then added to the lexicon 308. The lexicon 308 is reformulated by appending the expanded consonant phoneme inventory to its existing reference index. Once the lexicon is reformulated 310 the ARS is system is trained using the most current information. The training model can be realized by the use of hidden Markov models (HMMs), support vector machines (SVMs) and Neural Networks (NNs).

Figure 4:
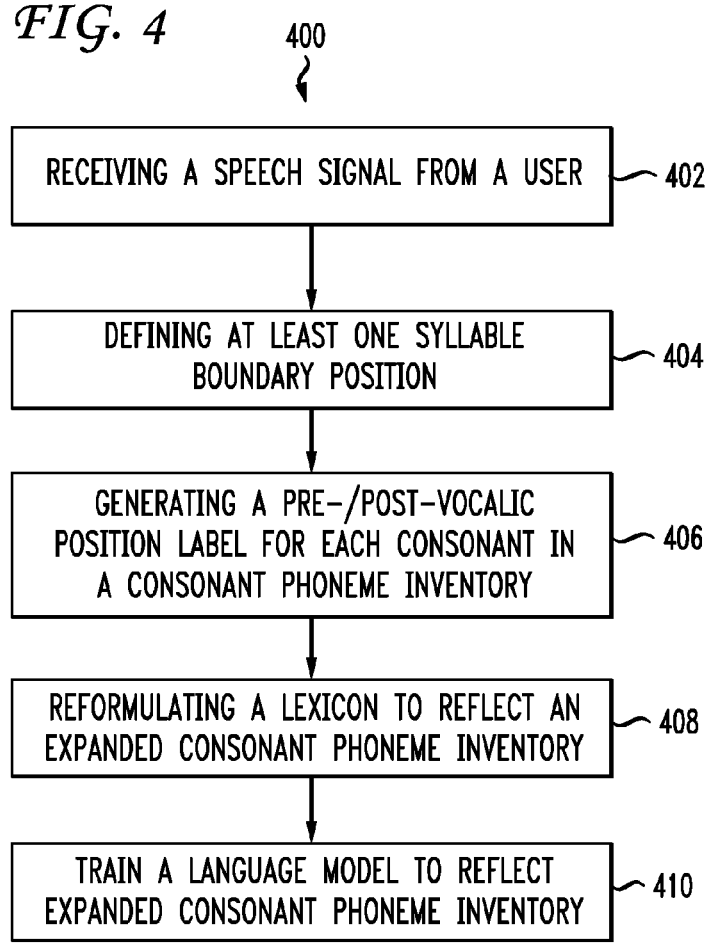
FIG. 4 illustrated an exemplary method embodiment.

An alternative of the embodiment is shown in FIG. 4. A flow chart of an embodiment of the method (400) may include the step of receiving a speech signal from a user (402). The method may define at least one syllable boundary position in the received speech signal (404). Based on the at least one syllable boundary position, the method may generate for each consonant in a consonant phoneme inventory a pre-vocalic position label or a post-vocalic position label to expand the consonant phoneme inventory (406). The method may include the reformulation of a lexicon to reflect an expanded consonant phoneme inventory (408). The method may further train a language model for an automated speech recognition (ASR) system based on the reformulated lexicon (410).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. The method of improving output from a speech recognizer by training models, the method comprising;
    receiving a speech signal;
    defining at least one syllable boundary position for a word in the speech signal;
    based on the at least one syllable boundary position, generating for each consonant in a syllable of the word one of a pre-vocalic position label and a post-vocalic position label;
    expanding a portion of a consonant phoneme inventory associated with the word to include the one of the pre-vocalic position label and the post-vocalic position label to yield an expanded consonant phoneme inventory;
    reformulating a lexicon to reflect the expanded consonant phoneme inventory and yield a reformulated lexicon; and
    training a language model for an automated speech recognition system based on the reformulated lexicon.

2. The method of claim 1, wherein the at least one syllable boundary position uses the one of the pre-vocalic position label and the post-vocalic position label.

3. The method of claim 1, wherein the at least one syllable boundary position reflects acoustic changes based on the post-vocalic consonant position label relative to the vowels within the syllable.

4. The method of claim 1, wherein the at least one syllable boundary position reflects acoustic changes based on the pre-vocalic consonant position label relative to the vowels within the syllable.

5. The method of claim 1, wherein at least one training model is built by using hidden Markov models, support vector machines or neural networks.

6. The method of claim 1, wherein the expanded consonant phoneme inventory creates two labels for each consonant to be used by the lexicon.

7. A non-transitory computer-readable medium storing instructions for controlling a computing device to train a language model, the instructions comprising:
    receiving a speech signal;
    defining at least one syllable boundary position for a word in the speech signal;
    based on the at least one syllable boundary position, generating for each consonant in a syllable of the word one of a pre-vocalic position label and a post-vocalic position label;
    expanding a portion the consonant phoneme inventory associated with the word to include the one of the pre-vocalic position label and the post-vocalic position label to yield an expanded consonant phoneme inventory;
    reformulating a lexicon to reflect the expanded consonant phoneme inventory and yield a reformulated lexicon; and
    training language model for an automated speech recognition system based on the reformulated lexicon.

8. The non-transitory computer-readable medium of claim 1, wherein the at least one syllable boundary position uses the one of the pre-vocalic position label and the post-vocalic position label.

9. The non-transitory computer-readable medium of claim 1, wherein the at least one syllable boundary position reflects acoustic changes based on the post-vocalic consonant position label relative to the vowels within the syllable.

10. The non-transitory computer-readable medium of claim 1, wherein the at least one syllable boundary position reflects acoustic changes based on the pre-vocalic consonant position label relative to the vowels within the syllable.

11. The non-transitory computer-readable medium of claim 1, wherein at least one training model is built by using hidden Markov models, support vector machines or neural networks.

12. The non-transitory computer-readable medium of claim 1, wherein the expanded consonant phoneme inventory creates two labels for each consonant to be used by the lexicon.

13. A system for improving output from a speech recognizer by training models, the system comprising;
    a processor;
    a first module configured to cause the processor to receive a speech signal;
    a second module configured to cause the processor to define at least one syllable boundary position for a word in the speech signal;
    a third module to cause the processor configured to generate for each consonant in a syllable of the word a pre-vocalic position label and a post-vocalic position label based on the at least one syllable boundary position;
    a fourth module configured to cause the processor to expand a portion of a consonant phoneme inventory associated with the word to include the one of the pre-vocalic position label and the post-vocalic position label to yield an expanded consonant phoneme inventory;
    a fifth module configured to cause the processor to reformulate a lexicon to reflect an expanded consonant phoneme inventory and yield a reformulated lexicon; and
    a sixth module configured cause the processor to train a language model for an automated speech recognition system based on the reformulated lexicon.

14. The system of claim 1, wherein the at least one syllable boundary position uses the one of the pre-vocalic position label and the post-vocalic position label.

15. The system of claim 1, wherein the at least one syllable boundary position reflects acoustic changes based on the post-vocalic consonant position label relative to the vowels within the syllable.

16. The system of claim 1, wherein the at least one syllable boundary position reflects acoustic changes based on the pre-vocalic consonant position label relative to the vowels within the syllable.

17. The system of claim 1, wherein at least one training model is built by using hidden Markov models, support vector machines or neural networks.

18. The system of claim 1, wherein the expanded consonant phoneme inventory creates two labels for each consonant to be used by the lexicon.

* * * * *